United States Patent [19]

Baker

[11] 4,139,975
[45] Feb. 20, 1979

[54] UNIVERSAL RETAINER ASSEMBLY

[76] Inventor: Edward S. Baker, 717 S. Birch Pl., Broken Arrow, Okla. 74012

[21] Appl. No.: 811,982

[22] Filed: Jun. 29, 1977

[51] Int. Cl.² .......................... E04B 1/62; F16B 21/04
[52] U.S. Cl. ............................................ 52/506; 85/7
[58] Field of Search ................. 52/506, 405, 410, 362, 52/511; 85/1 L, 7, 21, 28, 86, 8.8; 24/108, 216, 208

[56] References Cited

U.S. PATENT DOCUMENTS

| 2,993,110 | 7/1961 | Godley | 85/7 |
| 4,018,023 | 4/1977 | Anderson | 52/410 |

FOREIGN PATENT DOCUMENTS

| 1141441 | 1/1969 | United Kingdom | 85/7 |

Primary Examiner—John E. Murtagh

[57] ABSTRACT

A retainer assembly for securing insulation material or similar material in mounted position against or alongside of a wall surface or the like. The retainer assembly includes a longitudinally extending extension or stud having a retaining washer longitudinally adjustably mounted thereon in a secure and positive manner. In one embodiment, the extension is adjustably supported by use of an extension holder which adjustably connects to the extension and is welded or otherwise bonded to a furnace wall. In another embodiment, the extension is adjustably mounted in a bore whereby the end of the extension having the retaining washer thereon may be oriented to secure the insulation material or liner in predetermined relation to the supporting surface or wall such as refractory brick or the like.

9 Claims, 11 Drawing Figures

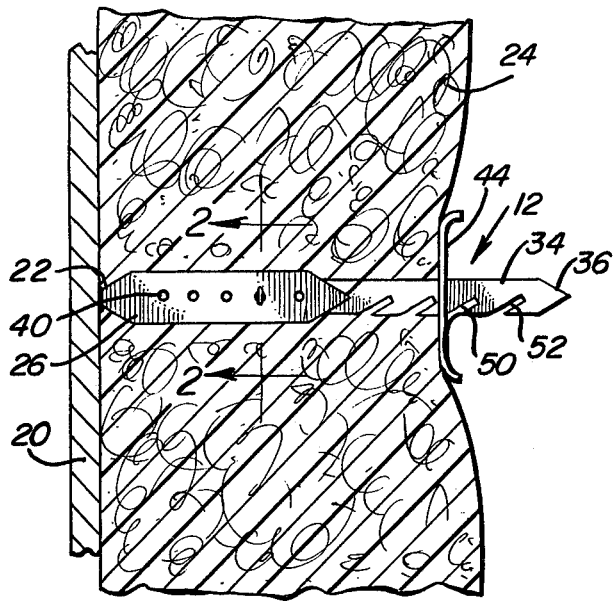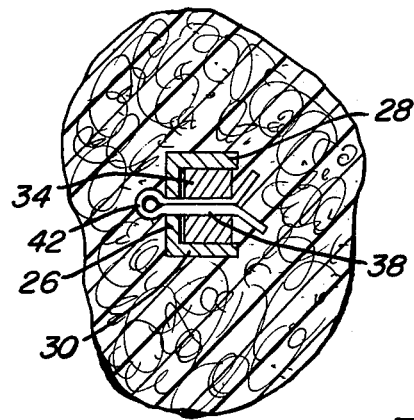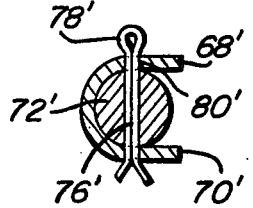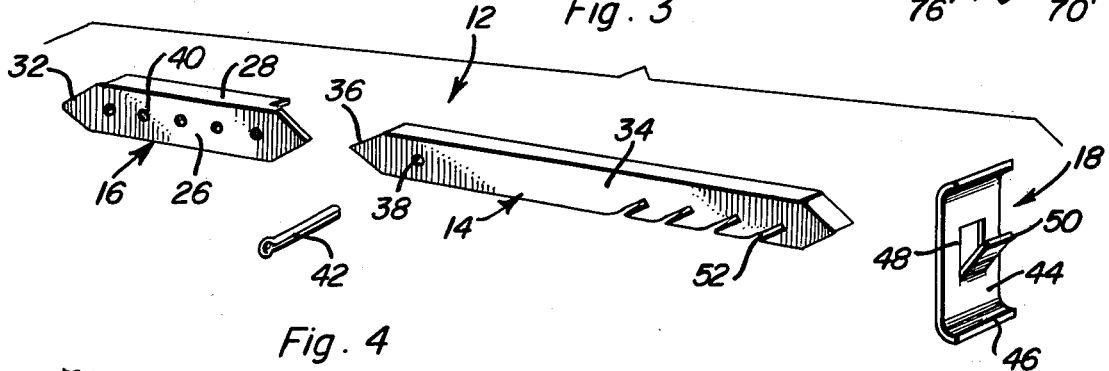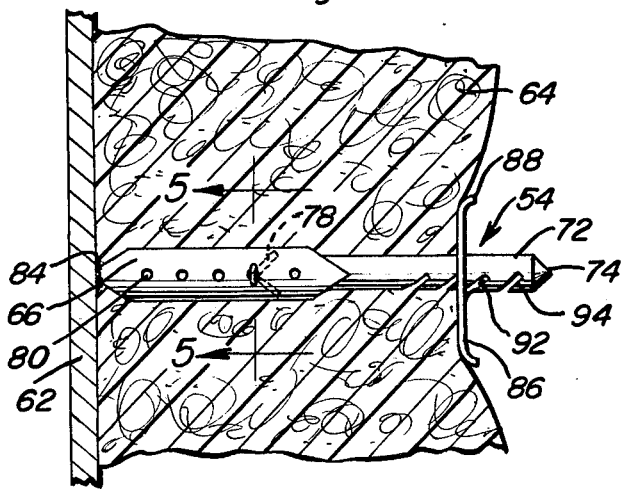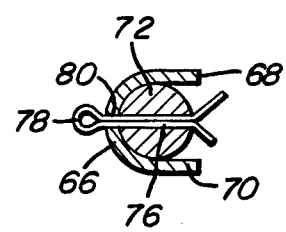

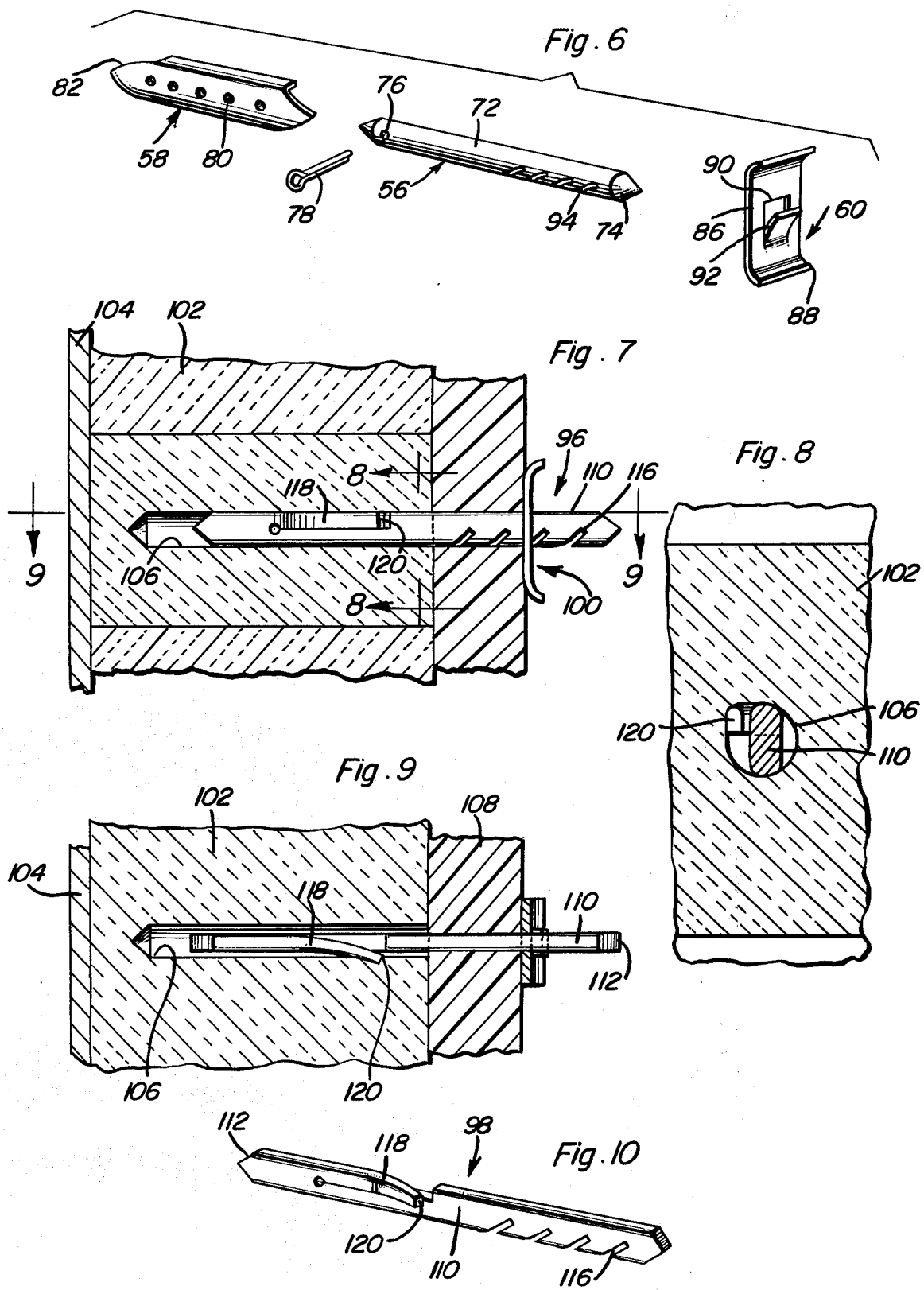

UNIVERSAL RETAINER ASSEMBLY

BACKGROUND OF THE INVENTION

1. Field of the Invention

The present invention generally relates to the mounting of a liner of insulation-like material to the interior of a furnace wall or on other surfaces having a refractory lining associated with high temperature conditions with the retainer assembly including a secure mounting which is adjustable in length for use with insulation linings of different thicknesses and materials.

2. Description of the Prior Art

Many furnaces and other areas in which high temperature conditions occur are provided with an interior wall of refractory brick or other similar refractory materials. In addition, a liner of insulating material is mounted on the interior surface of the refractory wall. Such insulation materials includes various types of bats, blankets, panels, blocks or the like of various types of insulating materials which are capable of being mounted by penetrating the material with a supporting member which is rigidly affixed to the wall on which the insulation material is to be mounted. U.S. Pat. No. 3,523,395 issued to Rutter et al on Aug. 11, 1970 illustrates one example of known type structures for mounting insulating material on the interior of a furnace wall. U.S. Pat. No. 3,738,217 to Walker issued June 12, 1973 illustrates another type of assembly for securing insulating material to a furnace wall which includes an elongated stud welded at one end to the supporting wall and the opposite end including an adjustable mounted retaining washer.

SUMMARY OF THE INVENTION

An object of the present invention is to provide a universal retainer assembly having an elongated extension adjustably supported from the supporting wall for enabling various types and thicknesses of insulating material to be penetrated and supported together with a retaining member on the adjustable extension which is longitudinally adjustable on the extension for further enhancing the utility of the retainer assembly under various conditions and to enable a single type of retainer assembly to be used with various materials, various thicknesses of materials and under various conditions.

A further object of the invention is to provide a universal retainer assembly including an extension holder rigidly affixed to a furnace wall such as by welding or the like and an extension longitudinally adjustably secured to the holder by the use of a plurality of longitudinally spaced apertures receiving an anchoring device therethrough with the holder being of generally U-shaped or channel-shaped configuration with horizontally disposed flanges receiving the extension therebetween so that the flanges on the holder engage the top and bottom surfaces of the extension in order to effectively support the extension.

A further object of the invention is to provide a retainer assembly in which the extension is in the form of an elongated shank having a laterally displaced anchoring tine struck therefrom to adjustably secure the extension in a bore formed in a refractory wall or the like so that the extension may be inserted into the bore and secured therein without external fastening devices.

Still another object of the invention is to provide a retainer assembly in accordance with the preceding objects in which the extension is provided with a plurality of inclined, slot-like notches therein receiving a projecting tongue on a retaining washer for adjustably mounting the washer on the extension thereby securing insulating material to the wall to which the extension is anchored either by virtue of the extension holder or by mounting in a bore in a refractory wall.

Yet another object of the invention is to provide a universal retainer assembly and a liner of insulating type materials for a wall or similar surface which is easily installed, readily adjusted and universally adapted for use with various types and thicknesses of materials with the retainer assembly being secure when installed but yet easily assembled and disassembled for installation or replacement of insulating material.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a sectional view illustrating one embodiment of the universal retainer assembly of the present invention for securing insulation material to a wall.

FIG. 2 is a transverse sectional view, on an enlarged scale, taken substantially upon a plane passing along section line 2—2 of FIG. 1 illustrating the specific structural details of the connection between the extension and extension holder.

FIG. 3 is an exploded perspective view of the components of the embodiment of the invention illustrated in FIG. 1.

FIG. 4 is a sectional view similar to FIG. 1 but illustrating another embodiment of the invention.

FIG. 5 is a sectional view, on an enlarged scale, taken substantially upon a plane passing along section line 5—5 of FIG. 4 illustrating the associational relationship between the extension holder and extension together with the securing means for securing the extension to the extension holder.

FIG. 5a is a sectional view similar to FIG. 5 but illustrating a different orientation of the fastening means between the extension and extension holder.

FIG. 6 is an exploded group perspective view of the embodiment of the invention illustrated in FIG. 4.

FIG. 7 is a sectional view of a refractory wall with another embodiment of the retainer assembly illustrated in combination therewith.

FIG. 8 is a transverse, sectional view, on an enlarged scale, taken substantially upon a plane passing along section line 8—8 of FIG. 7 illustrating the structural association of the extension and projecting anchoring tine struck therefrom.

FIG. 9 is a longitudinal, sectional view, taken substantially upon a plane passing along section line 9—9 of FIG. 7 illustrating further structural details of the mounting connection between the extension and bore in the refractory wall.

FIG. 10 is a perspective view of the extension illustrated in FIGS. 7-9.

DESCRIPTION OF THE PREFERRED EMBODIMENTS

Referring now specifically to FIGS. 1-3, the universal retainer assembly is generally designated by reference numeral 12 and includes four components, namely an extension 14, an extension holder 16, a retaining washer 18 and a fastening device 42. The extension holder 16 is secured to the interior of a furnace wall 20 or other similar wall of metallic construction by welding 22 or by any other permanent and secure anchoring means with the extension holder 16 extending perpendicularly therefrom. The extension holder 16 and the extension 14 mounted thereon extend through and penetrate a liner of insulating type material 24 which protects the furnace wall 20 or a refractory wall surface on the interior of the furnace wall and the retaining washer 18 is adjustably mounted on the extension 14 and engages the interior surface of the insulation material 24 to secure it in position on the furnace wall and to enable replacement thereof when necessary.

The extension holder 16 is of generally channel-shaped configuration with the web 26 being vertically oriented and upper and lower flanges 28 and 30 extending perpendicularly therefrom in superimposed spaced relation as illustrated in FIG. 2. The ends of the web 26 may be tapered or pointed as at 32 and the construction of the extension holder 16 is symmetrical so that either end thereof may be welded to the furnace wall 20 and the flanges 28 and 30 may be oriented so that they are disposed to either side of the web 26.

The extension 14 is an elongated rigid metal member of rectangular cross-sectional configuration as designated by numeral 34 with the vertical dimension thereof being substantially the same as the distance between the interior surfaces of the horizontal flanges 28 and 30 and the thickness thereof being substantially the same as the length of the flanges or legs 28 and 30 as illustrated in FIG. 2. Each end of the extension is provided with tapering or pointed ends 36 and adjacent one end of the elongated member 34, there is provided a transversely extending aperture 38 for alignment with one of a series of longitudinally spaced apertures 40 in the web 26 of the extension holder 16 so that a fastener device 42 such as cotter pin, bolt-nut-washer assembly, rivet, screw, spring clamp or the like may be inserted through one of the apertures 40 and the aperture 38 for adjustably anchoring the extension 14 to the extension holder 16 with the fastening device 42 being illustrated in installed relation in FIG. 4. To obtain a wider range of overall length control and/or to obtain additional rigidity on long assemblies, more than one aperture 38 may be placed in extension 14 spaced equally to match two or more apertures 40 in extension holder 16. The pointed ends of the extension holder 16 and the extension 14 enable penetration of the insulating material 24 with the positioning of the fastening device 42 enabling overall longitudinal length adjustment of the extension holder 16 and extension 14 so that an adequate portion of the end of the elongated member 34 will project interiorly of the insulation 24 in order to receive the retainer 18.

The retainer 18 is in the form of a generally rectangular plate 44 having slightly curved upper and lower edges 46 and a central aperture 48 defined by a laterally struck-out and inclined tongue 50. The inclined tongue 50 extends generally in the same direction as the curved edges 46 and cooperates with the opening 48 in a manner that when the plate 44 is tilted, it can be moved longitudinally in relation to the elongated member 34. The bottom surface of the elongated member 34 is provided with a plurality of inclined slot-like notches 52 therein which are inclined from the bottom edge of the elongated member 34 toward the end thereof remote from the extension holder 16. The inclination of the notches 52 is the same as the inclination of tongue 50 and receives the tongue 50 when the plate 44 is oriented in perpendicular relation to the extension 14 as illustrated in FIG. 1. The compressibility of the insulation material 24 enables disassembly of the tongue 44 from the notch 52 by forcing the lower end of the plate 44 inwardly as illustrated in FIG. 4 so that the plate will tilt as the tongue 50 disengages from the notch 52 after which the plate can be removed by retaining it in its tilted position. Assembly of the plate 44 also requires the plate to be tilted and the insulation material slightly compressed so that the tongue 50 can move past the notch 52 into which it will be inserted after which the plate 44 is tilted to its vertical or perpendicular relation to the elongated member 34. This provides a positive connection between the retainer washer 18 and the extension 14 but yet one which can be readily disconnected for replacement of the insulation material 24 when desired.

FIGS. 4–6 illustrate another embodiment of the invention generally designated by numeral 54 which is also constructed of three components, namely, an extension 56, an extension holder 58 and a retaining washer 60 which are associated with a furnace wall 62 and insulation type material 64 in the same manner as illustrated in FIGS. 1 and 2. In this construction, the extension holder 58 is in the form of an elongated member of U-shaped construction as indicated by numeral 62 with two legs 68 and 70 generally paralleling each other and generally spaced from each other as illustrated in FIG. 5. The extension 56 is in the form of an elongated rod 72 of circular transverse configuration having pointed ends 74, an aperture 76 adjacent one end for receiving a fastener 78 which also extends through one of a series of holes 80 in the U-shaped member 66. The ends of the U-shaped member 66 are also pointed as indicated by numeral 82 and one end thereof is rigidly affixed to the furnace wall as by welding 84 or the like. The retaining washer 60 is identical to the retainer washer 18 and includes a plate 86 having outwardly curved top and bottom edges 88 and a centrally disposed aperture 90 with an inclined tongue 92 integral with the lower edge thereof for reception in one of a plurality of slot-like notches 94 formed in the undersurface of the elongated rod 72. Operation of this structure is the same as that illustrated in FIGS. 1–3 with the transverse end of the tongue 92 engaging the straight transverse bottom of the notches 94 to retain the washer 60 in non-rotative relation to the rod 72. The shape of the aperture 90 may be rectangular or it may be circular but the notches 94 and the tongue 92 are transversely straight. FIG. 5 illustrates the orientation of the fastener 78 in relation to the bight portion of the U-shaped member 66 so that the fastener 78 is generally parallel to the legs 68 and 70. FIG. 5a illustrates a modified arrangement in which the fastener 78' is extended vertically through aligned apertures 80' in the legs 68' and 70', respectively. The fastener 78 or 78' also is in the form of a cotter pin which enables longitudinal adjustment of the extension in relation to the extension holder.

FIGS. 7–10 illustrate another embodiment of the universal retainer assembly generally designated by numeral 96 which includes an elongated extension generally designated by numeral 98 having a retaining washer 100 mounted thereon. In this embodiment of the invention, a refractory wall 102 is provided along the interior of the furnace wall 104 and the extension 98 is secured to the refractory wall by providing a bore 106 in the refractory wall 102 which communicates with the innersurface thereof with a layer or liner of insulating-like material 108 being disposed against the innersurface of the refractory wall 102. The extension 98 includes an elongated member 110 in the form of a metal bar or the like of generally rectangular cross-sectional configuration and provided with pointed ends 112 and a plurality of longitudinally spaced notches 116 adjacent one end for engaging and receiving the retaining washer 100. This portion of the extension 98 is the same as the extension 14 or 56 but in this arrangement, a separate extension holder is not employed. Rather, the upper edge of the bar 110 is provided with a laterally deflected tang 118 struck therefrom having a free end 120 normally spaced laterally from the bar 110 as illustrated in FIGS. 8-10. The bar 110 and the tang 118 are substantially rigid but the tang 118 has some degree of flexibility so that as the bar 110 is inserted into the bore 106, the free end 120 of the tang 118 will engage the sidewall of the bore 106 in a manner to preclude longitudinal outward movement of the bar 110 thereby securely and adjustably anchoring the extension 98 to the refractory wall 102. The tang may be struck-out from or may be added onto a metal bar or stud and this embodiment of the invention may be used where the refractory wall is firebrick or other hard, somewhat porous material. In installing this embodiment of the invention, a hole is drilled into the hard porous material which may be a refractory wall or rigid insulating material or the like, after which the metal anchoring stud or extension 98 is dipped into a bonding material, such as mortar, and it is then inserted into the hole 106 approximately 2 inches or more. The tang 118 will compress laterally to align the bar or stud body 110 with the hole or bore 106 and the end 120 of the tang will seat into the hard material.

Each of the embodiments disclosed utilizes adjustable connection between the retaining washer and the stud or extension which does not require any rotation of the washer in relation to the stud but rather a tilting or pivoting movement of the washer in relation to the stud with the resiliency and compressibility of the insulating material enabling the washer to be pivoted but yet retaining the retaining washer in adjusted position. The washer will be retained in position, that is, generally perpendicular to the stud by gravity even if the insulation does not exert any outward force thereon since the weight of the tongue and the orientation of the aperture in the washer is closer to the upper end than the lower end. Thus, the center of gravity of the washer is such that it will remain in place in adjusted position on the extension or stud unless it is manually manipulated and tilted so that the tongue is withdrawn from the notch and retained in that position while it is moved longitudinally off of the extension or stud.

Depending upon the material of the furnace wall, the extension holder may be bonded directly thereto such as by welding or by using other bonding material or the extension or stud may be secured directly to a bore in a firebrick or other refractory wall and in any event, the retaining washer securely retains the insulation material in place but enables the ready replacement thereof when necessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A retainer assembly for supporting an insulating type material from a wall comprising an elongated extension in the form of a stud, means on one end of the stud for supporting engagement with a wall and a retaining member mounted on the opposite end of the stud, said retaining member and stud including cooperating means for adjustably mounting the retaining member on the stud without requiring rotation of the retaining member, said means on the stud and retaining member including a plurality of longitudinally spaced slot-like notches formed in the undersurface of the stud with the notches being inclined inwardly and longitudinally toward the end of the stud remote from the supporting means, said retaining member including an aperture therethrough with the lower edge of the aperture being defined by an upwardly extending, inclined tongue received in one of the notches when the retaining member is perpendicular to the stud, said aperture and tongue being associated with the stud to require that the retaining member be inclined so that the tongue generally parallels the undersurface of the stud during longitudinal movement of the retaining member thereon.

2. The structure as defined in claim 1 wherein said retaining member is in the form of a washer of plate-like construction with the center of gravity thereof being oriented such that gravity will retain the retaining member perpendicular to the stud when the tongue is engaged in one of the notches thereby requiring tilting movement of the retaining member in relation to the stud in order to release the retaining member from the stud.

3. The structure as defined in claim 1 wherein said means supporting the stud from the wall includes an extension holder having one end anchored to a furnace wall such as by welding, said extension holder telescopically receiving said stud and means adjustably interconnecting the extension holder and stud.

4. The structure as defined in claim 3 wherein said means adjustably interconnecting the extension holder and stud includes an aperture through the stud, a plurality of longitudinally spaced apertures in the extension holder and a fastener extending through a selective aperture in the extension holder and the aperture in the stud for longitudinally adjusting the stud in relation to the extension holder.

5. The structure as defined in claim 4 wherein said extension holder is generally channel-shaped in configuration with laterally extending, vertically spaced portions receiving the extension therebetween for supporting the stud along its top and bottom surface for stability of the extension in relation to the extension holder.

6. A retainer assembly for supporting an insulating type material from a wall comprising an elongated extension in the form of a stud, means on one end of the studs for supporting engagement with a wall and a retaining member mounted on the opposite end of the stud, said retaining member and stud including cooperating means for adjustably mounting the retaining member on the stud without requiring rotation of the retaining member, said means supporting the extension from the wall including a wall of refractory type material having a bore formed therein, said extension including an end portion inserted into the bore, said end portion of the extension including a laterally deflected tang tang engaged with the bore when the end portion of the extension is inserted therein to prevent retraction of the extension from the bore.

7. The structure as defined in claim 6 wherein said tang has a free end facing outwardly of the bore toward the retaining member for engaging the wall of the bore to prevent removal of the extension but enabling insertion of the extension into the bore.

8. In combination with a furnace wall and a liner of insulating type material on the interior surface thereof, a retainer assembly for securing the liner on the furnace wall, said retainer assembly including an elongated member having one end adjustably supported from the furnace wall, the other end of the elongated member having a retaining washer adjustably and removably secured thereto for securing the liner in supported relation to the furnace wall, said elongated member including a plurality of longitudinally spaced notches communicating with the lower surface thereof and being inclined longitudinally toward the end of the elongated member over which the retainer washer is inserted, said washer including an aperture therein and an upwardly and laterally inclined tongue at the bottom of the aperture for reception in one of the notches, said apertures in the washer and tongue being related to the elongated member such that the washer must be tilted so that the tongue generally parallels the undersurface of the elongated member during insertion of and movement of the washer along the elongated member with the washer having a center of gravity so that the tongue will enter one of the notches when aligned therewith and the washer permitted to assume a perpendicular relation to the elongated member.

9. The structure as defined in claim 8 wherein the furnace wall includes a layer of refractory material having a bore therein communicating with the inner surface thereof, said elongated member being telescopically inserted into said bore, the inner end portion of said elongated member including laterally extending means resiliently gripping the interior of the bore to secure the elongated member in said bore, said notches in the elongated member being disposed in the end portion thereof which projects inwardly from the inner surface of the refractory layer.

* * * * *